(12) United States Patent
Gunturi et al.

(10) Patent No.: US 7,874,220 B2
(45) Date of Patent: Jan. 25, 2011

(54) CORIOLIS MASS FLOWMETER WITH AN OSCILLATABLE STRAIGHT MEASURING TUBE

(75) Inventors: Satish Gunturi, Kantonsspital (CH); Frank Kassubek, Rheinfelden (DE); Jörg Gebhardt, Mainz (DE); Lothar Deppe, Göttingen (DE); Matthias Dettmer, Cremlingen (DE); René Friedrichs, Rosdorf (DE); Robert Huber, Ketsch (DE); Steffen Keller, Constance (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 11/984,301

(22) Filed: Nov. 15, 2007

(65) Prior Publication Data

US 2008/0202257 A1    Aug. 28, 2008

(30) Foreign Application Priority Data

Nov. 16, 2006  (DE)  .................. 10 2006 054 009
Oct. 25, 2007  (DE)  .................. 10 2007 051 420

(51) Int. Cl.
*G01F 1/84* (2006.01)
(52) U.S. Cl. ................................. 73/861.357
(58) Field of Classification Search ..............................
73/861.355–861.357
See application file for complete search history.

(56) References Cited

U.S. PATENT DOCUMENTS

| | | | |
|---|---|---|---|
| 5,113,690 A * | 5/1992 | van Nistelrooij et al. | 73/861.12 |
| 5,351,561 A * | 10/1994 | Wenger et al. | 73/861.357 |
| 5,476,013 A * | 12/1995 | Hussain et al. | 73/861.357 |
| 6,330,832 B1 * | 12/2001 | Normen et al. | 73/861.357 |
| 6,336,369 B1 * | 1/2002 | Gomi et al. | 73/861.357 |
| 6,360,614 B1 * | 3/2002 | Drahm et al. | 73/861.357 |
| 6,374,478 B1 * | 4/2002 | Neece et al. | 73/861.357 |
| 6,487,917 B1 * | 12/2002 | Van Cleve et al. | 73/861.357 |
| 6,523,421 B1 * | 2/2003 | Tanner et al. | 73/861.357 |
| 6,543,281 B2 * | 4/2003 | Pelletier et al. | 73/152.47 |
| 6,598,489 B1 * | 7/2003 | Van Cleve et al. | 73/861.357 |
| 6,634,241 B1 * | 10/2003 | Van Cleve | 73/861.357 |
| 6,684,716 B2 * | 2/2004 | Ohnishi et al. | 73/861.357 |
| 6,769,163 B2 * | 8/2004 | Van Cleve | 29/447 |

(Continued)

FOREIGN PATENT DOCUMENTS

DE      103 51 312 A1     5/2005

(Continued)

*Primary Examiner*—Harshad Patel
(74) *Attorney, Agent, or Firm*—Buchanan Ingersoll & Rooney PC

(57) ABSTRACT

The disclosure relates to a Coriolis mass flowmeter with an oscillatable straight measuring tube consisting of a corrosion-resistant metal, in particular of titanium or a titanium alloy, to which are attached mounted parts connected directly to the measuring tube for the implementation of the Coriolis measurement principle. Furthermore, stabilizing elements running parallel to the measuring tube are coupled to the measuring tube via mounted parts connected directly to the measuring tube, the mounted parts and the stabilizing elements consisting of a metal other than that of the measuring tube. The stabilizing elements are manufactured from a second material which possesses a coefficient of thermal expansion adapted to the metal of the measuring tube. The mounted parts connected directly to the measuring tube are manufactured from a third material which possesses a higher coefficient of thermal expansion than the metal of the measuring tube.

15 Claims, 1 Drawing Sheet

U.S. PATENT DOCUMENTS

| | | | |
|---|---|---|---|
| 7,080,564 B2 * | 7/2006 | Rieder et al. | 73/861.357 |
| 7,171,860 B2 * | 2/2007 | Gebhardt et al. | 73/861.357 |
| 7,299,699 B2 * | 11/2007 | Lorenz | 73/861.355 |
| 2001/0049971 A1 * | 12/2001 | Tomikawa | 73/861.357 |
| 2005/0115335 A1 * | 6/2005 | Gebhardt et al. | 73/861.357 |
| 2006/0201260 A1 * | 9/2006 | Drahm et al. | 73/861.357 |
| 2007/0186684 A1 * | 8/2007 | Pham | 73/861.357 |
| 2008/0156110 A1 * | 7/2008 | Deppe et al. | 73/861.357 |

FOREIGN PATENT DOCUMENTS

EP    0 985 913 A1    3/2000

\* cited by examiner

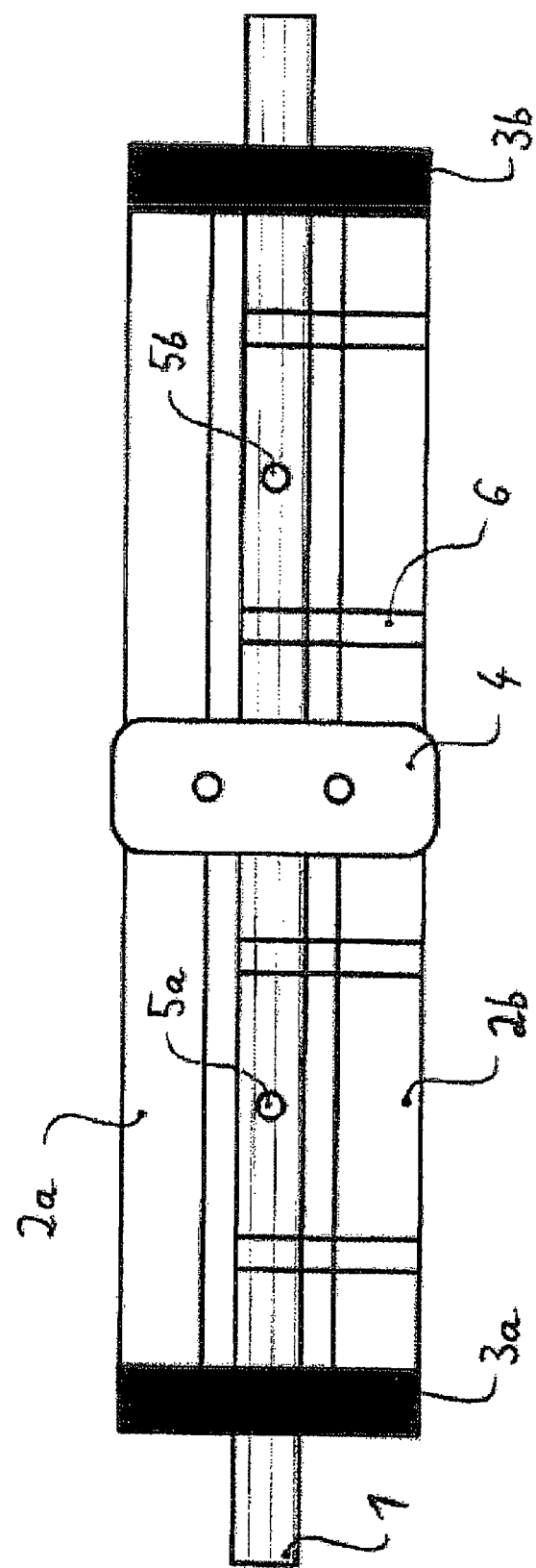
Figure

CORIOLIS MASS FLOWMETER WITH AN OSCILLATABLE STRAIGHT MEASURING TUBE

RELATED APPLICATIONS

This application claims priority under 35 U.S.C. §119 to German Patent Application No. 10 2007 051 420.6 filed in the German Patent Office on 25 Oct. 2007, and to German Patent Application No. 10 2006 054 009.3 filed in the German Patent Office on 16 Nov. 2006, the entire contents of which are hereby incorporated by reference in their entireties.

TECHNICAL FIELD

A Coriolis mass flowmeter with an oscillatable straight measuring tube is disclosed consisting of a corrosion-resistant metal, in particular of titanium or a titanium alloy, to which are attached mounted parts connected directly to the measuring tube for the implementation of the Coriolis measurement principle and to which at least one stabilizing element running parallel to the measuring tube is coupled via mounted parts connected directly to the measuring tube.

BACKGROUND INFORMATION

The Coriolis mass flowmeters with straight tube geometry, which are of interest here, are optimal in flow terms and are employed mainly in process engineering plants, in order to measure mass throughflows through a pipeline. For this purpose, the meter excites the measuring tube, through which fluid flows, into periodic oscillation. The influence of the fluid flow on the oscillation behavior is measured at least two locations on the measuring tube. The mass throughflow can be determined from the phase difference of the measurement signals at the measurement locations.

A generic Coriolis mass flowmeter is known from DE 103 51 312 A1. This consists of a straight measuring tube which oscillates in coupled flexion and torsion modes and the oscillation behavior of which is detected by sensor technology for the purpose of subsequent signal evaluation. The straight measuring tube has connected to it mechanically a mounted part which is designed rotationally symmetrically with respect to a rotational symmetry axis and which can be set in torsional oscillations of the same frequency as, but opposite phase position to, the torsional oscillation modes of the measuring tube. The mounted part is a multipart body which may consist of hollow profile rails and balancing elements.

The force action of the fluid on the measuring tube wall on account of the flow is very low, as compared with other forces which arise. So that the measurement effect can be distinguished from background and interference, the construction and symmetry of the meter must satisfy stringent requirements. In particular, however, the meter must be decoupled as completely as possible in oscillation terms from its surroundings, in particular the pipeline. Such decoupling, which is also designated as balancing, is achieved here by means of the mounted parts.

A further Coriolis flowmeter, which is stabilized by means of a compensation cylinder surrounding the measuring tube, may be gathered from EP 0 985 913 A1. The compensation cylinder is connected to the measuring tube in a way in which axial relative movements are ruled out. As a result, expansions or stresses which arise due to the straight design of the measuring tube are compensated. These expansions or stresses which arise in the event of temperature differences would otherwise impair the measurement accuracy. In an extreme instance, stresses induced thermally in this way may even lead to mechanical damage, to be precise to stress cracks, on the measuring tube.

Furthermore, from the general prior art in the field of Coriolis mass flowmeters with a straight measuring tube, it is known to produce measuring tubes from a corrosion-resistant metal, preferably from titanium or titanium alloys. Titanium and its alloys, because of their mechanical properties, to be precise a relatively low thermal expansion and low rigidity (modulus of elasticity), may be considered for a wide range of temperatures in use. Moreover, titanium is resistant to a multiplicity of corrosive media.

To implement the Coriolis measurement principle, further mounted parts, such as drive and balancing elements and end plates, are provided on the titanium measuring tube. In addition, there are stabilizing elements which are arranged between the end plates, are connected to the end plates and are therefore coupled to the measuring tube via the end plates.

It is conceivable, in principle, that the mounted parts and stabilizing elements also consist, like the measuring tube, of titanium or a titanium alloy. However, titanium is less suitable for use in the stabilizing element and, in practice, is also not used for this purpose, since a material having a higher density and consequently, with a comparable volume, having a higher mass is required for this application. In generic Coriolis mass flowmeters, therefore, the mounted parts and the stabilizing elements consist of a metal other than that of the measuring tube.

The mounted parts and the stabilizing elements are usually manufactured from steel which has a coefficient of thermal expansion other than that of the titanium measuring tube and are connected to the measuring tube via connection techniques, such as brazing or welding. The same connection techniques are also employed for connecting the stabilizing elements to the end plates.

Brazing, in particular, requires various brazing alloys in order to implement a high-quality connection between the titanium of the measuring tube and the metal of the other mounted parts.

During the attachment, taking place while the meter is being manufactured, of stabilizing elements, running parallel to the measuring tube, between the end plates, in particular by brazing or welding, however, the different coefficient of expansion of the titanium measuring tube and of the stabilizing elements consisting of steel proves to be a disadvantage. Owing to the different expansion during heating to brazing temperature or welding temperature and to contraction during cooling, stresses are introduced into the structure and lead to warpings and distortions during brazing or welding. In order as far as possible to prevent this, usually a plurality of brazing or welding steps are carried out in a defined order, although this correspondingly increases the outlay in production terms.

SUMMARY

An exemplary Coriolis mass flowmeter is disclosed with an oscillatable straight measuring tube consisting of a first material, a corrosion-resistant metal, in particular of titanium or a titanium alloy, to which are attached mounted parts connected directly to the measuring tube for the implementation of the Coriolis measurement principle and to which at least one stabilizing element running parallel to the measuring tube is coupled via mounted parts connected directly to the measuring tube. The at least one stabilizing element is manufactured from a second material which possesses a coefficient of thermal expansion adapted to the metal of the measuring tube.

BRIEF DESCRIPTION OF THE DRAWINGS

Further measures improving the disclosure are illustrated below, together with the description of a exemplary embodiment of the disclosure, with reference to the single FIGURE.

The FIGURE shows a diagrammatic side view of a Coriolis mass flowmeter with an oscillatable straight measuring tube.

DETAILED DESCRIPTION

An object of the present disclosure, therefore, is to improve further a Coriolis mass flowmeter of the generic type, to the effect that a reliable materially integral connection between the individual components is possible at as low an outlay as possible in production terms.

The disclosure includes the technical teaching that the stabilizing elements are manufactured from a second material which possesses a coefficient of thermal expansion adapted to the metal of the measuring tube.

According to an exemplary embodiment of the disclosure, the mounted parts connected directly to the measuring tube are manufactured from a third material which possesses a higher coefficient of thermal expansion than the metal of the measuring tube.

According to a further exemplary embodiment, at least two stabilizing elements are present, which run parallel to the measuring tube and, expanded in the axial direction of the measuring tube, are coupled to the measuring tube at a plurality of locations via mounted parts connected directly to the measuring tube.

In this case, the at least one stabilizing element or the at least two stabilizing elements can be manufactured from a ferritic high-grade steel, and the mounted parts can be manufactured from an austenitic high-grade steel.

Austenitic high-grade steels have a higher coefficient of thermal expansion than the titanium usually used for a measuring tube.

The use of austenitic high-grade steel for the mounted parts has the advantage, in the case of welded or brazed connections of the mounted parts to the titanium tube, that, after cooling to room temperature, materially integral connection locations are under compressive stress and are therefore less susceptible to tensile stresses, caused by mechanical oscillation stresses, than mounted parts consisting of steel with a similar coefficient of thermal expansion to titanium.

The exemplary solution according to the disclosure is reflected in the fact that the various mounted parts and the stabilizing elements can, within a single work step, be connected to one another and to the measuring tube or coupled to the measuring tube, e.g., by brazing or welding, that is to say in a materially integral way. A warping or distortion of the structure is no longer to be feared on account of the special choice of material.

The use of ferritic high-grade steel for the stabilizing elements prevents a deformation of the measuring tube as a result of the otherwise different expansion of a measuring tube consisting of titanium and of the stabilizing elements running in parallel.

The use of austenitic high-grade steel for the mounted parts which are connected directly to the measuring tube has the advantage that, after cooling to room temperature, materially integral connection locations are under compressive stress and are therefore less susceptible to tensile stresses caused by mechanical oscillation stresses than mounted parts consisting of steel with a similar coefficient of thermal expansion to titanium or titanium alloys.

The solution according to the disclosure not only includes the specially specified ferritic and austenitic high-grade steels for the defined components, but, of course, also, within the framework of equivalence, other steel or composite materials which are known to a person skilled in the art to have comparable properties.

For example, a duplex steel may be considered as an exchange material equivalent to austenitic steel. For example, an unalloyed or a low-alloyed steel may be considered as an exchange material equivalent to ferritic steel.

The described components of the Coriolis mass flowmeter are, e.g., with the exception of the measuring tube, produced from high-grade steel, in order to achieve a corrosion resistance to external influences which is required for the meter. What is central is that austenitic or ferritic high-grade steel is used for defined components. The austenitic high-grade steel used most often is the alloy X5CrNi18-10 which is often employed as stainless steel for medical instruments or the like.

Austenitic high-grade steels are usually nickel-containing and nonmagnetic and possess a high coefficient of thermal expansion (approx. $16\text{-}17\times10^{-6}$ at room temperature).

Ferritic high-grade steels possess a higher strength than austenitic steels and are therefore used mostly for tools and the like. In addition to chrome, vanadium and molybdenum are also often contained. Ferritic high-grade steels are magnetic, in contrast to austenitic high-grade steels. The coefficient of thermal expansion normally lies, at room temperature, in the range of $10\text{-}11\times10^{-6}$ and is therefore adapted to the coefficient of thermal expansion of titanium and its alloys. The wording "adapted" may be said when the coefficient of thermal expansion of the stabilizing element deviates by no more than 20% from that of the measuring tube consisting of titanium. Typical ferritic high-grade steels are X30Cr13 or X45CrMoV15.

In the Coriolis mass flowmeter according to the disclosure, the stabilizing elements can be arranged opposite one another on both sides of the measuring tube and can have an annular cross section. A high mechanical stability, along with a minimal deadweight, is thereby imparted to the stabilizing tubes. However, furthermore, they may also have a rectangular, square or elliptic cross section. Moreover, it is advantageous if the stabilizing elements consist of hollow material. As a result, further weight is saved, while strength remains uniformly high.

According to a further measure which improves the disclosure, the stabilizing tubes may be connected to one another and to the measuring tube on the end faces in each case via an end plate, in order to produce a rigid structure. The end plates likewise can consist, as mounted parts, of an austenitic high-grade steel, in order, in particular, to ensure reliable materially integral connection to the measuring tube consisting of titanium.

A mounted part which may be considered is also, in particular, a carrier part for attaching at least one electrical component, e.g., an exciter coil for generating the mechanical oscillations for the measuring tube. The carrier part likewise consists, as a mounted part, of an austenitic high-grade steel or an equivalent of this, in order to achieve the advantages outlined above in connection with the end plate.

Further connecting elements for electrical components may be applied directly to the measuring tube on both sides of the carrier part. These connecting elements can serve for the attachment of oscillation sensors for detecting the oscillation response of the measuring tube through which the fluid flows, said oscillation response subsequently being processed further by signal technology in order to determine the mass throughflow.

The Coriolis mass flowmeter according to the disclosure may also have, as a further mounted part, at least one balancing element which is attached to the measuring tube between a stabilizing element and the measuring tube. Balancing elements serve for setting the oscillation behavior and can be fastened in the region between the end plates on the measuring tube in order to fulfill the function assigned to them.

According to the FIGURE, the longitudinal axis of the flowmeter is determined by a measuring tube 1 which consists here of titanium, so that it is corrosion-resistant with respect to aggressive measurement media.

The measuring tube 1 is surrounded by further mounted parts for the implementation of the Coriolis measurement principle, which are connected fixedly to the measuring tube 1. These include primarily the balancing elements 6, the connecting elements 5a, 5b, a carrier part 4 and the end plates 3a and 3b. The region of the measuring tube between the two end plates may also be designated as the measurement stage.

The stabilizing elements 2a and 2b are attached on both sides of the measuring tube 1 and parallel to the latter between the end plates 3a and 3b. Said stabilizing elements are fastened to the end-face end plates 3a and 3b and are thereby coupled to the measuring tube 1.

The carrier part 4, provided as a mounted part, likewise makes a fixed connection with the measuring tube 1 in a materially integral way, by brazing. It serves as a carrier part for attaching an electrical or electromechanical component, not illustrated in any more detail, in this case an exciter arrangement, by means of which the measuring tube is set in oscillations.

Further connecting elements 5a and 5b, likewise for electrical components, not illustrated in any more detail, are provided directly on the measuring tube 1 on both sides of the carrier part 4. The electrical components are oscillation sensors, by means of which the oscillations of the measuring tube are detected by measurement.

Furthermore, at least one balancing element 6 is arranged on the measuring tube 1. The balancing elements 6 serve for setting the oscillation behavior of the flowmeter. In the embodiment shown here, four balancing elements are attached, in each case two balancing elements being placed between each end plate 3a and 3b and the carrier part 4 along the longitudinal extent of the measuring tube.

In order to prevent disturbing mechanical stresses during manufacture between the above-described components connected fixedly to one another, there is provision for manufacturing the stabilizing tubes 2a and 2b from a ferritic high-grade steel, whereas the remaining mounted parts are manufactured from an austenitic high-grade steel.

The disclosure is not restricted to the exemplary embodiment described above. On the contrary, modifications of this may also be envisaged, which are covered by the scope of protection of the following claims. Thus, for example, it is also possible, for the special components defined according to the claims, to select equivalent materials with similar properties which are known to a person skilled in the art on the basis of his specialized knowledge.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Measuring tube
2a Stabilizing element
2b Stabilizing element
3a End plate
3b End plate
4 Carrier part
5a Connecting element
5b Connecting element
6 Balancing element

What is claimed is:

1. A Coriolis mass flowmeter, comprising:
an oscillatable straight measuring tube consisting of titanium or a titanium alloy, to which are attached mounted parts connected directly to the measuring tube for the implementation of the Coriolis measurement principle and to which at least one rigid stabilizing element running parallel to the measuring tube is coupled via mounted parts connected directly to the measuring tube, wherein the at least one stabilizing element is manufactured from a material which possesses a coefficient of thermal expansion which deviates from the coefficient of thermal expansion of the measuring tube by no more than 20%, and
wherein the mounted parts connected directly to the measuring tube comprise at least one of end plates, a balancing element, a carrier part, and a connecting element, and are manufactured from a material which possesses a higher coefficient of thermal expansion than the metal of the measuring tube.

2. The Coriolis mass flowmeter as claimed in claim 1, wherein at least two stabilizing elements run parallel to the measuring tube and, expanded in the axial direction of the measuring tube, are coupled to the measuring tube at a plurality of locations via mounted parts connected directly to the measuring tube.

3. The Coriolis mass flowmeter as claimed in claim 2, wherein the stabilizing elements are arranged opposite one another on both sides of the measuring tube.

4. The Coriolis mass flowmeter as claimed in claim 3, wherein the at least one stabilizing element consists of hollow material.

5. The Coriolis mass flowmeter as claimed in claim 2, wherein the at least two stabilizing elements are manufactured from a ferritic high-grade steel.

6. The Coriolis mass flowmeter as claimed in claim 2, wherein the at least two stabilizing elements are connected to the measuring tube via end plates.

7. The Coriolis mass flowmeter as claimed in claim 1, wherein the at least one stabilizing element is manufactured from a ferritic high-grade steel.

8. The Coriolis mass flowmeter as claimed in claim 7, wherein the mounted parts are manufactured from an austenitic high-grade steel.

9. The Coriolis mass flowmeter as claimed in claim 1, wherein the mounted parts are manufactured from an austenitic high-grade steel.

10. The Coriolis mass flowmeter as claimed in claim 1, wherein the mounted parts are connected to the measuring tube or to one another by at least one of brazing and welding.

11. The Coriolis mass flowmeter as claimed in claim 1, wherein the at least one stabilizing element has a rectangular, square, circular or elliptic cross section.

12. The Coriolis mass flowmeter as claimed in claim 1, wherein the at least one stabilizing element is connected to the measuring tube via end plates.

13. The Coriolis mass flowmeter as claimed in claim 12, wherein at least one balancing element for setting the oscillation behavior is arranged on the measuring tube between the end plates.

14. A Coriolis mass flowmeter comprising:
- an oscillatable straight measuring tube formed of a first material based on a corrosion-resistant metal;
- mounted parts connected to the measuring tube for implementation of Coriolis measurement; and
- a rigid stabilizing element disposed parallel to the measuring tube to be coupled via mounted parts, wherein the stabilizing element is formed of a second material having a coefficient of thermal expansion which deviates from the coefficient of thermal expansion of the measuring tube by no more than 20%, and
- wherein the mounted parts connected to the measuring tube comprise at least one of end plates, a balancing element, a carrier part, and a connecting element, and are manufactured from a material which possesses a higher coefficient of thermal expansion than the metal of the measuring tube.

15. The Coriolis mass flowmeter as claimed in claim 14, wherein the straight measuring tube consists of titanium or a titanium alloy.

* * * * *